Figure 1:
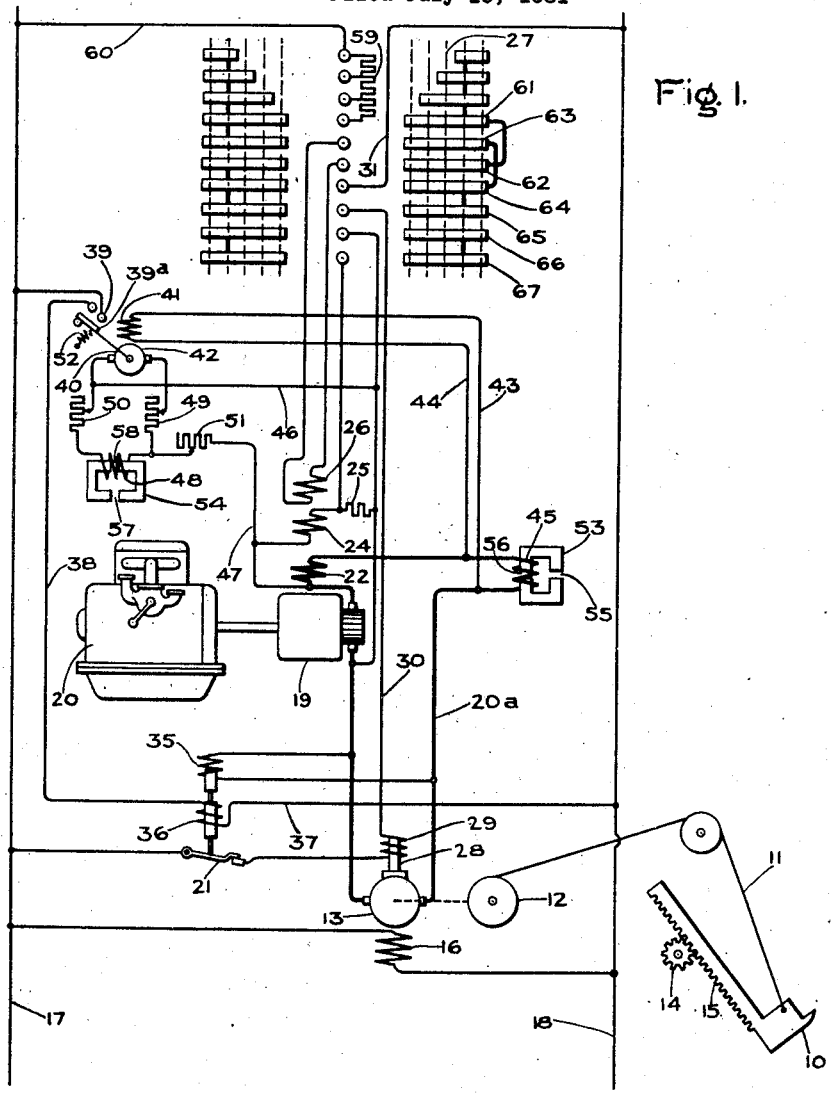

March 14, 1933.    M. A. WHITING    1,901,685
CONTROL SYSTEM
Filed July 13, 1931

Inventor:
Max A. Whiting,
by Charles E. Tullar
His Attorney.

Patented Mar. 14, 1933

1,901,685

UNITED STATES PATENT OFFICE

MAX A. WHITING, OF SCHENECTADY, NEW YORK, ASSIGNOR TO GENERAL ELECTRIC COMPANY, A CORPORATION OF NEW YORK

CONTROL SYSTEM

Application filed July 13, 1931. Serial No. 550,405.

My invention relates to control systems for dynamo electric machines; more particularly to control systems for electric motors operating on an overhauling load, and has for its object a simple and reliable system for applying a power absorbing effect in dependence upon the rate of change of the load.

My invention is particularly useful in the control of motors for driving hoists, dredges, elevators and the like wherein the driving motor is often driven as a generator by an overhauling load. Where an electrical supply source or other suitable facilities are available for absorbing the regenerative power of the motor in braking the load, the problem is quite simple. In self-contained units, however, such as where the motor is supplied from a reciprocating engine driven generator, it has been found that the power losses in the engine are not sufficient, unless the engine is permitted to race, to absorb the regenerative power of the motor under certain conditions. To avoid undue wear and damage to the engine, it is therefore desirable to use the hoist brake or other means to absorb the excess regenerative power, but a difficulty encountered is the control of the application of the brake in proper dependence upon the power to be absorbed.

More particularly the difficulty is as follows: The brakes should not be applied in response to a light regenerative load, as the engine losses can absorb such regeneration and the application of the brakes would only slow down unnecessarily the lowering of the dipper. In response to a heavy regenerative load the brakes should be applied but if the brake application is initiated only when the regenerative load has reached a formidable magnitude the engine will be overspeeded while the brakes are coming into action. What is required, therefore, is a responsive means operative in advance of the attainment of a formidable value of regenerative load, so that the brakes are in process of setting while the regenerative load is rising toward a formidable value.

In an equipment such as the dredge indicated in the drawing, a heavy regenerative load ordinarily rises to its maximum at a higher rate in kilowatts per second, than does a regenerative load which attains only a very moderate maximum. I utilize this difference in rate of rise of load as a means of anticipating a heavy regenerative load and of actuating protective means accordingly.

In carrying out my invention in one form I provide means responsive to the rate of change of the regenerative power for controlling the application of a braking effect so as to meet varying conditions of operation.

Figure 2:
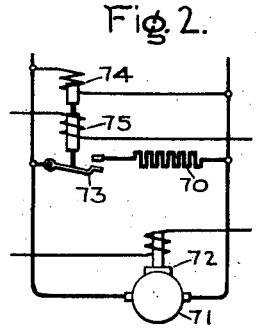

For a more complete understanding of my invention reference should be had to the accompanying drawing, Fig. 1 of which is a diagrammatic representation of a system of control embodying my invention for a gas-electric driven dredge; while Fig. 2 is a fragmentary view showing a modified form of my invention.

Referring to the drawing I have shown my invention in one form as applied to a dipper dredge shown diagrammatically as comprising a dipper 10 which is raised and lowered by means of a cable 11 attached at one end to the dipper and having its other end secured to the winding drum 12 driven by an electric motor 13. For the thrust or crowd motion a pinion 14 is provided which cooperates with a rack 15 on the dipper. The pinion 14 is driven by a suitable motor, but for purposes of clarity this driving means has been omitted. Likewise the swing mechanism, spuds and other essential parts of the dredge are not shown. The driving motor 13 is provided with a separately excited field 16 connected to the supply mains 17 and 18 which may be energized from a suitable direct current source (not shown) having sufficient capacity to take care of the control circuits and field energization required. Current is supplied to the armature of the motor 13 from a generator 19 which is driven by a suitable prime mover, such as a gasoline engine 20. As shown the motor 13 and generator 19 are connected together permanently by a conductor 20a in a form of the Ward Leonard system well known in the electric shovel art and in use also in electric dipper dredges. The field energization for the generator 19 is supplied by a differential series field winding 22, a shunt field winding 24 connected through a resistance 25 across the terminals of the generator 19, and a separately excited field winding 26, the direction and degree of energization of which from the supply mains 17 and 18 may be controlled by a hand operated drum controller or switch 27.

The motor 13 is provided with a mechanical brake 28 by means of which a braking load may be supplied when the motor 13 is being driven by the dipper 10 as when lowering the dipper. As shown in the drawing, the brake 28 is used not only in carrying out my invention but also as the means of holding the dipper at rest while the controller 27 remains in the "off" or neutral position. If preferred, however, the brake 28 may be used solely in carrying out my invention and another brake may be provided for operating responsively to the controller 27 in the conventional manner. Brake 28 is biased to the brake applied position by means of suitable spring mechanism (not shown) and it is released by means of an operating coil 29, the energization of the coil releasing the brake. One terminal of the coil 29 is connected to the supply main 17 through an electromagnetically operated switch 21 and its other terminal is connected through the conductor 30 to the drum switch 27 so that when the drum switch is turned from the "off" position shown to a running position in either direction, the conductor 30 is connected to the conductor 31 leading to the supply main 18. This energizes the winding 28 and releases the brake, except as the brake may be applied by the opening of the switch 21 in the manner described hereinafter.

The function of the switch 21 is to open the circuit of the winding 29 and in this way control the application of the brake to take care of overhauling of the motor 13. This switch 21 is provided with an operating coil 35 which is connected across the terminals of the motor so as to be energized in accordance with the motor voltage and with a second winding 36, one terminal of which is connected through a conductor 37 to the supply main 18 while the other terminal is connected through a conductor 38 and the switch 39 to the supply main 17.

The coils 35 and 36 act in the same direction to open switch 21, the force of the coil 36 being sufficient alone to open the switch but the force of coil 35 being insufficient for that purpose and contributing very little effort toward that end. At all except relatively low voltages of the motor 13, the coil 35 is itself capable of holding the switch 21 open after it has once been opened by the coil 36.

The switch 39 is operated to control the energization of the coil 36 and in accordance with the rate of change of the regenerative load. This operation of the switch 39 is effected by means of a small torque motor 40 having its field winding 41 energized in accordance with the combined effect of the magnitude and the rate of change of the armature current of the motor 13. The armature 42 of the torque motor 40, provided with a suitable winding, is energized in accordance with the combined effect of the magnitude and the rate of change of voltage of the motor 13. As shown the field winding 41 is connected through conductors 43 and 44 across a reactor coil 45 which is connected in the armature circuit of the driving motor, while the armature 42 is connected by conductors 46 and 47 across the terminals of the motor 13 or more specifically, as shown, across the terminals of the generator 19 in parallel with a reactor coil 48. Adjustable resistors 49 and 50 are connected in the parallel circuits in series respectively with the armature 42 and the reactor winding 48, while an adjustable current limiting resistance 51 is connected in series with the two parallel circuits. The movable contact 39a of the switch 39 is carried on an arm connected to the shaft of the armature 42 and is biased by a spring 52 to the open position. It will be understood that the torque motor 40 and the switch 39 operated by it constitute a relay which is responsive to the combined effect of the load in kilowatts and the rate of change of that load.

The field 41 and armature 42 are so connected that while the motor 13 is operating as a motor, for example while digging or hoisting, the torque of the torque motor 40 acts cumulatively with a spring 52 in holding the contacts open, but for regenerative loads of the motor 13 the torque motor 40 tends to close the switch 39 in opposition to the spring 52.

An important function of the reactors 45 and 48 is to introduce a rate of change function into the energization of the field winding 41 and the armature winding 42 of the torque motor to thereby control the operation of the switch 21 and hence the application of the brake 28.

The resistances of the field 41 and the reactor coil 56 are so proportioned with respect to each other, and the resistances of the reactor coil 58, armature 42 and resistors 49, 50 and 51 are so proportioned with respect to each other, that the torque motor 40 operates to open its contacts at any steady-state regenerative load of a magnitude in kilowatts greater than the engine can properly absorb. That is to say, although typically the function of the relay is to respond quickly to a rapidly rising load before a formidable load is attained, its protective action is not lost merely because the load may upon occasion rise slowly to a formidable value.

Upon a rapid rise in motor voltage and current, however, such as would be caused by a suddenly applied regenerative load on the motor, the inductances of the reactors produce counter electromotive forces whereby a substantial amount of the motor current is caused to flow through the field winding 41 and a substantial voltage is applied to the armature 42. In other words, a disproportionately large amount of the current in the motor armature is caused to flow through the field winding 41 and at the same time the rapid increase in voltage causes a disproportionately large amount of the current in the circuit of the resistance 51 to flow through the armature 42. Thus because of the rapid rise of regenerative power the torque of relay 40 rises sufficiently to close the switch 39 before the regenerative power has risen to a value detrimental to the engine.

Where the increase in regenerative power is caused by an increasing current and an increasing generator voltage at the same time, the action on the torque motor field and armature is cumulative. In certain cases, however, the regenerative load may produce a rapid increase in motor current alone in which case the increase in energization of the field winding 41 will close the switch 39 and apply the brake.

Therefore, the relay constituted by the torque motor 40 and the switch 39, in accordance with its response to the change in motor operation previously described, initiates the application of the brake immediately upon the occurrence of a rapid increase in regenerative load so that the brake is partly or fully applied by the time the regenerative load has risen to a critical value, that is, a value too great to be absorbed wholly by the engine without detrimental racing.

The adjustable resistance 51 is provided to limit the current through the circuit in which the armature 42 and the reactor coil 48 are connected in parallel, while the resistances 49 and 50 are provided for the purpose of adjusting the relation of the normal currents flowing through the armature and the reactor. Ordinarily, these currents will be adjusted to be about equal, that is, the total current through the resistance 51 will be divided approximately equally between the reactor and the armature. A sudden increase in motor voltage produces a change in the current in the reactor coil which change is opposed by the reactor whereby a disproportionately large amount of current is passed through the armature. If desired, to adjust the operation, similar adjustable resistances may be used with the field winding 41 and reactor 45.

It will be understood that in order to produce the desired operation, the time constant L/R (inductive divided by resistance) of the reactor 45 will be much greater than the time constant L/R of the field winding 41 and the same is true of the time constant of the reactor 48 as compared with that of the armature 42. The ohmic resistance of the reactor winding 45 will be very low as compared with the resistance of the field winding 41.

Preferably, as shown, the reactors 45 and 48 are provided with cores 53 and 54 made of a suitable magnetic core iron whereby the inductance of each reactor is increased with relation to its ohmic resistance. For the purpose of obtaining further regulation of the inductance, the core 53 is provided with air gaps 55 and 56 while the core 54 is provided with air gaps 57 and 58.

The reactors are designed so as to be relatively unsaturated at the maximum currents to which they are subjected in order that they shall be highly reactive throughout the entire range of operation.

In the operation of the system the starting, stopping and direction of rotation of the motor 13 is controlled by controlling the separately excited field 26 of the generator by means of the drum controller 27. When the controller is in the off position as shown, the winding 26 is deenergized and the resistance 25 is in series with the shunt winding 24. Consequently, since the series winding 22 acts differentially with respect to winding 24, no appreciable voltage is produced by the generator. Under these conditions also the brake coil 29 is deenergized since its circuit is broken by the controller 27 so that the brake is applied.

It is believed that the operation of the controller 27 will be clear from the drawing without a detailed tracing of the circuits. When the controller is moved from the off position shown in one or the other direction, the field winding 26 is connected across the supply mains 17 and 18 with the resistance 59 in series. This circuit may be traced from the conductor 17 through the conductor 60, the resistance 59, controller segment 61, thence to controller segment 62 through the field winding and back to the segment 63, and thence to the segment 64 and through the conductor 31 to the supply main 18. In this first position also the brake coil 29 is energized and this circuit may be traced from the supply main 17 through the switch 21, the coil 29, conductor 30, switch segment 65 to switch segment 64 thence through the conductor 31 to the supply main 18. Also the field resistance 25 is short circuited through the segments 66 and 67. Continued movement of the controller short circuits the resistance 59 in steps whereby the generator voltage, and hence the speed of the motor 13, is increased. Finally, the resistance 59 is entirely cut out whereupon the motor will be running at its maximum speed as determined by the load. During this continued movement of the controller, the connections for the brake magnet and the field resistance 25 remain unchanged. In the opposite direction of rotation of the controller the field winding 26 is connected to the supply mains 17 and 18 with reversed polarity and the resistance 59 is gradually cut out as before, the connections for the brake magnet and field resistance 25 being the same for both directions of rotation.

The operation of the entire equipment with respect to the automatic application of the brake is typically as follows: When the operator, desiring to lower the dipper to the bottom, moves the controller to the full-speed lowering position, thereby energizing the generator field as described, the generator voltage rises, tending momentarily to operate the motor 13 as a motor. The combined effect of the dipper weight and the current of the motor 13 accelerates the motor and the drum 12 but when no-load speed is attained the dipper begins to overhaul the motor 13, causing it to regenerate into the generator 19. Typically the regenerative load during this part of the cycle is not too great to be safely absorbed by the engine losses hence the relay 40 will have been adjusted so that it does not act under this condition. When the dipper approaches the bottom the operator moves the controller to the neutral position or to a forward position in order to retard the dipper. This latter position of the controller causes a greatly increased regeneration of power from the motor 13 into the generator 19. The voltage begins to decrease at a moderate rate but the current increases rapidly. The reactor 48 has comparatively little effect upon the armature current of the torque motor 40 because the decrease of voltage is only at a very moderate rate. The reactor 45, however, because of the rapid rise of load current, causes a disproportionately large fraction of the increment of load current to traverse the field 41 of the motor 40. This disproportionately large increment of current plus the current already existing in the field 41 causes the field of the torque motor 40 to be magnetized quickly to a high value. As the armature current of the motor 40 is relatively high because of the high voltage of the regenerated power, the interaction of field and armature causes the motor 40 to close the switch 39. This energizes the coil 36 which opens the switch 21 and thereby applies the brake 28. The setting of the brake absorbs the regenerative power so that the electrical regenerative power thereupon usually decreases to a very moderate value. This in turn allows the switch 39 to open. Thus if not otherwise provided against, the brake would release immediately after it had applied and would accordingly allow a detrimental regenerative load to be again imposed on the engine. To prevent the brake from being thus repeatedly applied and released, the coil 35 and its associated core are provided on the switch 21 constructed as described. The coil 35, energized by the fairly high voltage prevailing when the regenerative power is high, holds the switch 21 open once it has been opened. When the motor 13 in response to the controller movement and aided by the brake, has been retarded to a low speed, at which the regenerative power is no longer formidable, the coil 35 allows the switch 21 to drop, thus allowing the brake either to remain set or to release in response solely to the controller position.

Under the typical operating condition described the reactor 48 is not useful but on the other hand is not detrimental. Its utility will appear in the following description of a different but equally typical operating condition.

When a full dipper is swung over the scow into which the spoil is to be dumped, it is lowered perhaps 5 or 6 feet before dumping. When the controller is moved to the lowering position for this purpose, the regenerated power increases rapidly to a high peak. It is particularly necessary that the braking effort be applied quickly under this condition in order to protect the engine against racing and furthermore to keep the dipper from overspeeding and crashing down upon the scow. As, under this condition of regeneration, both the current and voltage rise rapidly, I have provided in my invention the reactive shunting arrangement of the reactor 48 and the resistors 49 and 50 as described. As the regenerative peak rises the field 41 is momentarily energized by a disproportionately large fraction of the current of the motor 13 as previously described. In addition the armature 42, because of the inductive shunting applied to it, is momentarily energized by a disproportionately greater current than corresponds to the voltage of motor 13. Thus the motor 40 immediately develops a relatively very high torque and closes the switch 39 very early thereby applying the brake at the earliest possible instant. The coil 35 on the switch 21 operates in the manner described hereinbefore, thereby insuring that although the brake reduces the electrically regenerated load this does not permit the brake to release again during the same regenerative movement.

In applying my invention to a certain dredge I have found that even when lowering a loaded dipper over a scow the inductive shunting of the field 41 in response to current is sufficient for the purpose, the inductive shunting of the armature 42 not being strictly essential in that example. The relay, however, was still responsive to the combined effect of the power and rate of change of power of the motor. It is evident that the inductive shunting of armature 42, if not provided originally, can readily be added later if found necessary in a specific installation.

If preferable for any reason, means other than a brake can be actuated by the relay comprised by torque motor 40. For example, a resistor may be switched across the terminals of motor 13 so that, although all of the regenerative power must be developed by motor 13, the resistor will absorb most of the regenerative power, thereby relieving the generator and engine equally as in the case where the brake is used for that purpose.

In Fig. 2 I have shown a modified form of my invention in which a dynamic braking resistance 70 is provided for absorbing the regenerative load on the motor 71. In this case the electromagnetically operated brake 72 has only the control provided from the manually operated controller, that is, the brake is applied when the controller is in the off position and it is released when the controller is moved to a running position. This means that the switch 21 of Fig. 1 is omitted in the brake circuit and a corresponding switch 73 is provided for connecting the resistance 70 across the armature terminals of the motor 71. This switch 73 is operated by two coils 74 and 75 which correspond respectively with the coils 35 and 36 of Fig. 1. It will be understood that the system of Fig. 2, except for the changes noted, is the same as the system of Fig. 1, and also the operation is the same as the operation of the system of Fig. 1.

While I have disclosed a preferred form of my invention, it will be understood that various modifications may be made, for example, in the control switch, the prime mover for driving the generator and the voltage and current responsive control means without departing from the spirit of my invention, the scope of which is set forth in the appended claims.

What I claim as new and desire to secure by Letters Patent of the United States is:

1. The combination with a dynamo electric machine having a variable power output, means for absorbing power from said dynamo electric machine and means responsive to the rate of change of said power output for controlling said power absorbing means.

2. The combination with a dynamo electric machine having a variable power output, means for absorbing power from said dynamo electric machine and means responsive to the combined effects of said power output and of the rate of change of said power output for controlling said power absorbing means.

3. The combination with a dynamo electric machine arranged for operation both as a motor and a generator, means for absorbing power from said dynamo electric machine and means responsive to the combined effects of the power output of said dynamo electric machine and the rate of change of said power output during flow of said power in one direction but unresponsive to said power output and said rate of change during flow of said power in the opposite direction for controlling said power absorbing means.

4. In a braking control system, the combination with a dynamo electric machine, of means for applying a braking load to said dynamo electric machine and means responsive to the rate of change of current in said dynamo electric machine for controlling said braking load applying means.

5. In a braking control system, the combination with a dynamo electric machine, of means for applying a braking load to said dynamo electric machine and means responsive to the combined effect of the current in said dynamo electric machine and the rate of change of said current for controlling said braking load applying means.

6. In a braking control system, the combination with a dynamo electric machine, of means for applying a braking load to said dynamo electric machine and a relay responsive to the combined effect of the power output of said dynamo electric machine and the rate of change of said power output for controlling said braking load applying means.

7. The combination with a motor connected to drive an overhauling load, of means for applying a braking load to said motor and means responsive to the rate of change of overhauling load on said motor for controlling said braking load applying means.

8. The combination with the generator driven by a prime mover, of a motor energized by said generator, said motor being connected to drive an overhauling load, means for applying a braking load to said motor and means responsive to the rate of change of load on said motor for controlling said braking load applying means so as to anticipate a relatively great increase in regenerative load.

9. A braking control system for a motor connected to drive an overhauling load comprising means for applying a braking load to the motor, a relay for controlling said braking load applying means, an operating winding for said relay connected to be energized in accordance with a function of the operation of said motor and a reactance coil connected in parallel with said winding whereby said winding is supplied with a disproportionate amount of current upon a rapid change in said motor function.

10. The combination with a dynamo electric machine having a variable power output and in which the voltage and current may both vary, means for absorbing power from said dynamo electric machine, a relay for controlling said power absorbing means, an inductively shunted winding for said relay connected substantially across the terminals of said dynamo electric machine and a second inductively shunted winding for said relay connected substantially in series with the armature of said dynamo electric machine, whereby said relay is responsive to the combined effects of said power output and the rate of change of said power output.

11. The combination with a motor, of means for applying a braking load to said motor, a relay for controlling the application of said braking load, a pair of operating windings on said relay connected to be energized respectively in accordance with the armature current and the voltage of said motor and reactance coils connected in parallel with said relay coils whereby said relay is caused to operate in accordance with the rate of change of said motor current and voltage.

12. The combination with a generator driven by a prime mover, of a motor energized by said generator, said motor being connected to drive an overhauling load, a relay responsive to the rate of change of load on said motor, a brake for said motor, an operating coil for releasing said brake, a switch in the circuit of said coil, a coil for opening said switch controlled by said relay and a second coil for said switch energized in accordance with the motor voltage.

13. The combination with a generator driven by a prime mover, of a motor energized by said generator, said motor being connected to drive an overhauling load, a relay switch provided with two operating coils connected to be responsive respectively to the current and voltage of said motor, reactance coils connected in parallel with said coils whereby said coils are energized in response to the rate of change of said current and voltage and means controlled by said relay switch for applying a braking load to said motor.

14. The combination with a dynamo electric machine having a variable power output, means for absorbing power from said dynamo electric machine, means responsive to the combined effect of the power output of said dynamo electric machine and the rate of change of said power output for controlling said power absorbing means and auxiliary control means for said power absorbing means responsive to the voltage of said dynamo electric machine.

15. The combination with a dynamo electric machine having a variable power output, means for absorbing power from said dynamo electric machine, a switch for controlling said power absorbing means, a winding for operating said switch, means responsive to the combined effect of the power output of said dynamo electric machine and the rate of change of said power output for controlling said winding and a second winding for said switch connected across said dynamo electric machine.

16. The combination in a control system for a dredge or the like provided with a work member, of a motor for operating said member, a generator for said motor, a prime mover for driving said generator, a controller for controlling the starting and stopping of said motor for each direction of operation and the application and release of said brake, said brake being applied when said controller is in a position to deenergize said motor, auxiliary braking means for said motor, means responsive to the combined effect of the power output of said motor and the rate of change of said power output for controlling said auxiliary braking means to thereby apply said auxiliary braking means to absorb excessive regenerative power output and auxiliary control means for said auxiliary braking means responsive to the voltage of said motor.

17. The combination with a motor connected to drive an overhauling load whereby said motor is driven as a generator, of a dynamic braking resistance for said motor and means responsive to the combined effect of the current in said motor and the rate of change of said current for connecting said resistance to said motor.

18. The combination in a control system for a dredge or the like provided with a work member of an electric motor for operating said member, an electro-magnetically operated brake for said motor, a controller for controlling the operation of said motor and the application of said brake, said brake being applied when said controller is in a position to deenergize said motor, a dynamic braking resistance for said motor, a switch in the circuit of said resistance and means responsive to the combined effect of power output of said motor and the rate of change of said power output for controlling said switch so as to connect said resistance across said motor to absorb excessive regenerative power output.

19. The combination in a control system for a dredge or the like provided with a work member, of a motor for operating said member, a generator for said motor, a prime mover for driving said generator, an electromagnetically operated brake for said motor, a controller for controlling the starting and stopping of said motor for each direction of operation and the application and release of said brake, said brake being applied when said controller is in a position to deenergize said motor, an electromagnetically operated switch for controlling said brake, a relay for controlling said switch in accordance with an operating condition of said motor, a pair of windings for said relay connected respectively to be energized in accordance with the voltage and current in said motor, an inductive shunt for each of said windings whereby said relay is responsive to the rate of change of power in said motor so as to apply said brake upon a predetermined rate of change of power and thereby prevent excessive racing of said prime mover under regenerative load conditions, and auxiliary control means for said switch responsive to the voltage of said motor.

In witness whereof, I have hereunto set my hand.

MAX A. WHITING.